United States Patent [19]
Holtcamp et al.

[11] Patent Number: 6,147,174
[45] Date of Patent: Nov. 14, 2000

[54] ALUMINUM BASED LEWIS ACID COCATALYSTS FOR OLEFIN POLYMERIZATION

[75] Inventors: Matthew W. Holtcamp, Huffman; Ching-Tai Lue, Houston, both of Tex.

[73] Assignee: Univation Technologies, LLC

[21] Appl. No.: 09/350,521

[22] Filed: Jul. 9, 1999

Related U.S. Application Data

[60] Provisional application No. 60/093,017, Jul. 16, 1998.

[51] Int. Cl.$^7$ ................................. C08F 4/44; C07F 5/06
[52] U.S. Cl. ...................... 526/160; 526/943; 526/348.6; 526/352; 526/130; 526/161; 526/901; 502/152; 556/170; 556/187
[58] Field of Search ..................... 526/160, 943, 526/348.6, 352, 130, 161, 901; 502/152; 556/170, 187

[56] References Cited

U.S. PATENT DOCUMENTS

| | | | |
|---|---|---|---|
| 5,198,401 | 3/1993 | Turner et al. | 502/155 |
| 5,288,677 | 2/1994 | Chung et al. | 502/152 |
| 5,296,433 | 3/1994 | Siedle et al. | 502/117 |
| 5,369,196 | 11/1994 | Matsumoto et al. | 526/127 |
| 5,427,991 | 6/1995 | Turner | 502/103 |
| 5,602,269 | 2/1997 | Biagini et al. | 556/170 |
| 5,643,847 | 7/1997 | Walzer, Jr. | 502/117 |
| 5,663,249 | 9/1997 | Ewen et al. | 526/134 |
| 5,721,183 | 2/1998 | Neithamer | 502/103 |
| 5,721,185 | 2/1998 | LaPointe et al. | 502/117 |
| 5,756,609 | 5/1998 | Cohen | 526/127 |
| 5,763,547 | 6/1998 | Kolthammer et al. | 526/129 |
| 5,807,939 | 9/1998 | Elder et al. | 526/160 |
| 5,834,393 | 11/1998 | Jacobsen et al. | 502/152 |

FOREIGN PATENT DOCUMENTS

| | | |
|---|---|---|
| 0277004 A1 | 8/1988 | European Pat. Off. . |
| 0 427 696 A2 | | |
| A3 | 5/1991 | European Pat. Off. . |
| 0 520 732 A1 | 12/1992 | European Pat. Off. . |
| 0 671 416 A1 | 9/1995 | European Pat. Off. . |
| 0694548 A1 | 1/1996 | European Pat. Off. . |
| 0719797 A2 | | |
| A3 | 7/1996 | European Pat. Off. . |
| 0771822 A1 | 5/1997 | European Pat. Off. . |
| 0 612 768 B1 | 11/1997 | European Pat. Off. . |
| 0 612 769 B1 | 11/1997 | European Pat. Off. . |
| 0 500 944 B1 | 10/1998 | European Pat. Off. . |
| 0 573 403 B1 | 11/1998 | European Pat. Off. . |
| 0 582 268 B1 | 11/1998 | European Pat. Off. . |
| 4-142306 | 5/1992 | Japan . |
| WO 91/14713 | 10/1991 | WIPO . |
| WO 92/01723 | 2/1992 | WIPO . |
| WO 93/14132 | 7/1993 | WIPO . |
| WO 93/19104 | 9/1993 | WIPO . |
| WO 95/04761 | 2/1995 | WIPO . |
| WO 95/15815 | 6/1995 | WIPO . |
| WO 96/04319 | 2/1996 | WIPO . |
| WO96/08519 | 3/1996 | WIPO . |
| WO 96/23004 | 8/1996 | WIPO . |
| WO 96/23005 | 8/1996 | WIPO . |
| WO 96/26967 | 9/1996 | WIPO . |
| WO 96/34021 | 10/1996 | WIPO . |
| WO 97/07141 | 2/1997 | WIPO . |
| WO 98/03558 | 1/1998 | WIPO . |
| WO 98/07515 | 2/1998 | WIPO . |

OTHER PUBLICATIONS

*Study Surf. Sci. Catal.* (*Catalyst Design for Tailor–Made Polyolefins*), Ewen, vol. 89, pp. 405–410, (1994).
*Jour. Poly. Sci., PTA: Poly. Chem.,* Chien et al., vol. 29, pp. 1603–1607, (1991).
*J. Am. Chem. Soc.,* Marks et al., vol. 113, pp. 3623–3625, (1991).
*J. Am. Chem. Soc.,* Baird et al., vol. 116, pp. 6435–6436, (1994).
*J. Am. Chem. Soc.,* Hair et al., vol. 121, pp. 4922–4923 (1999).
*Organometallics,* Bochmann et al., vol. 17, pp. 5908–5912, (1998).
*J. of Molecular Catalysis A: Chemical,* Lee et al., vol. 132, pp. 231–239, (1998).
*Organometallics,* Duchateau et al., vol. 16, pp. 4995–5005, (1997).
*Journal of Organometallic Chemistry,* Song et al., 545–546, pp. 597–600, (1997).
*Journal of Organometallic Chemistry,* Röttger et al., 518, pp. 17–19, (1996).
*Inorg. Chem.,* Belgardt et al., 1995, vol. 34, pp. 3821–3822.
*J. Chem. Soc., Chem. Commun.,* Bochmann et al., pp. 2081–2082, (1995).

*Primary Examiner*—David W. Wu
*Assistant Examiner*—R. Harlan
*Attorney, Agent, or Firm*—Jaimes Sher; Lisa Kimes Jones

[57] ABSTRACT

This invention is directed to a process for the preparation of polyolefins from one or more olefinic monomers comprising combining said olefins under olefin polymerization conditions with an organometallic catalyst compound that is activated for olefin polymerization by reaction with at least one Lewis acid aluminum compound of the formula $R_nAl(ArHal)_{3-n}$, where "ArHal" is a halogenated aryl group, n=1 or 2, and R is a monoanionic group other than a halogenated aryl group. The invention also relates to a polymer produced using the process and to the polymer itself.

14 Claims, No Drawings

ALUMINUM BASED LEWIS ACID COCATALYSTS FOR OLEFIN POLYMERIZATION

CROSS-REFERENCE TO RELATED APPLICATION

This patent application claims priority from Provisional U.S. application Ser. No. 60/093,017 filed Jul. 16, 1998, and is herein fully incorporated by reference.

FIELD OF THE INVENTION

This invention relates to the preparation of olefin polymers using ionic catalyst systems based on transition metal compounds activated by Lewis acids that are capable of providing stable polymerization catalysts.

BACKGROUND OF THE INVENTION

Group 13 based Lewis acids having three fluorinated aryl substituents are known to be capable of activating transition metal compounds into olefin polymerization catalysts. Trisperfluorophenylborane is demonstrated in EP 0 425 697 and EP 0 520 732 to be capable of abstracting a ligand for cyclopentadienyl derivatives of transition metals while providing a stabilizing, compatible noncoordinating anion. See also, Marks, et al, J. Am. Chem. Soc. 1991, 113, 3623–3625. The term "noncoordinating anion" is now accepted terminology in the field of olefin polymerization, both by coordination or insertion polymerization and carbocationic polymerization. See for example, EP 0 277 004, U.S. Pat. No. 5,198,401, and Baird, Michael C., et al, *J. Am. Chem. Soc.* 1994, 116, 6435–6436, and U.S. Pat. No. 5,668,324. The noncoordinating anions are described to function as electronic stabilizing cocatalysts, or counterions, for cationic metallocene complexes which are active for olefin polymerization. The term noncoordinating anion as used herein applies both to truly noncoordinating anions and coordinating anions that are at most weakly coordinated to the cationic complex so as to be labile to replacement by olefinically or acetylenically unsaturated monomers at the insertion site. The synthesis of Group 13-based compounds derived from trisperfluorophenylborane are described in EP 0 694 548. These Group 13-based compounds are said to be represented by the formula $M(C_6F_5)_3$ and are prepared by reacting the trisperfluorophenylborane with dialkyl or trialkyl Group 13-based compounds at a molar ratio of "basically 1:1" so as to avoid mixed products, those including the type represented by the formula $M(C_6F_5)_nR_{3-n}$, where n=1 or 2. Utility for the tris-aryl aluminum compounds in Ziegler-Natta olefin polymerization is suggested.

Perfluorophenylaluminum (toluene) has been characterized via X-ray crystallography. See, Hair, G. S., Cowley, A. H., Jones, R. A., McBurnett, B. G.; Voigt, A., J. Am. Chem. Soc., 1999, 121, 4922. Arene coordination to the aluminum complex demonstrates the Lewis acidity of the aluminum center. However, perfluorophenyl-aluminum complexes have been implicated as possible deactivation sources in olefin polymerizations which utilize $Trityl^+B(C_6F_5)_4^-$/alkylaluminum combinations to activate the catalysts. See, Bochmann, M.; Sarsfield, M. J.; Organometallics 1998, 17, 5908. Bochmann and Sarsfield have shown that $Cp_2ZrMe_2$ reacts with $Al(C_6F_5)_3 0.5$(toluene) with transfer of the $C_6F_5$-moiety forming metallocene pentafluorophenyl complexes. These complexes were reported having very low activity compared to the corresponding metallocene dimethyl complexes when activated with $B(C_6F_5)_3$ or $Trityl^+B(C_6F_5)_4^-$.

Supported non-coordinating anions derived from trisperfluorophenyl boron are described in U.S. Pat. No. 5,427,991. Trisperfluorophenyl boron is shown to be capable of reacting with coupling groups bound to silica through hydroxyl groups to form support bound anionic activators capable of activating transition metal catalyst compounds by protonation. U.S. Pat. No. 5,643,847 discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions.

Immobilized Group IIIA Lewis acid catalysts suitable for carbocationic polymerizations are described in U.S. Pat. No. 5,288,677. These Group IIIA Lewis acids are said to have the general formula $R_nMX_{3-n}$ where M is a Group IIIA metal, R is a monovalent hydrocarbon radical consisting of $C_1$ to $C_{12}$ alkyl, aryl, alkylaryl, arylalkyl and cycloalkyl radicals, n=0 to 3, and X is halogen. Listed Lewis acids include aluminum trichloride, trialkyl aluminums, and alkylaluminum halides. Immobilization is accomplished by reacting these Lewis acids with hydroxyl, halide, amine, alkoxy, secondary alkyl amine, and other groups, where the groups are structurally incorporated in a polymeric chain. James C.W. Chien, Jour. Poly. Sci.: Pt A: Poly. Chem, Vol. 29, 1603–1607 (1991), describes the olefin polymerization utility of methylalumoxane (MAO) reacted with $SiO_2$ and zirconocenes and describes a covalent bonding of the aluminum atom to the silica through an oxygen atom in the surface hydroxyl groups of the silica.

In view of the above there is a continuing need for an activating cocatalyst compound that improves the industrial economics and provides a simpler method of synthesis and preparation of suitable activating compounds for ionic catalyst systems. Additionally, improvements in gas phase and slurry polymerization of olefins, where supported catalysts are typically used, are sought to meet the demanding criteria of industrial processes.

SUMMARY OF THE INVENTION

This invention relates to a process for the preparation of polyolefins from one or more olefinic monomers comprising combining the olefinic monomers with the reaction product of i) a transition metal organometallic catalyst compound and ii) a neutral, aluminum-based Lewis acid compound wherein the aluminum contains at least one, preferably two, halogenated aryl ligands and one or two additional monoanionic ligands not including halogenated aryl ligands.

The invention is also directed to an ethylene copolymer having a relatively narrow molecular weight distribution with an unexpected improvement in melt strength as compared to equivalent density and melt index polymers having the same melt flow ratio as expressed as $I_{21}/I_2$. As a result, the polymers of this invention have better bubble stability. In particular, the invention is to an ethylene copolymer having a density greater than 0.900 g/cc, and a $_{21}/I_2$ in the range of from about 15 to about 25, and a melt strength in the range of from 6 to about 11 cN or higher. In a preferred embodiment, the polymer is made in a gas phase polymerization process using the supported catalyst of the invention.

DESCRIPTION OF THE INVENTION

The invention provides a process in which a Lewis acid activator and the organometallic catalyst precursor compounds can be combined to form an active catalyst for olefin polymerization. The invention further provides for the subsequent contacting, or in situ catalyst formation, with insertion polymerizable monomers, those having accessible olefinic unsaturation, or with monomers having olefinic unsaturation capable of cationic polymerization. The catalyst according to the invention is suitable for preparing polymers and copolymers of two or more olefinically unsaturated monomers.

The Lewis acid compounds of the invention include those olefin catalyst activator Lewis acids based on aluminum and having at least one bulky, electron-withdrawing ancillary ligand such as the halogenated aryl ligands of tris (perfluorophenyl)borane or tris(perfluoronaphtyl)borane. These bulky ligands are those sufficient to allow the Lewis acids to function as electronically stabilizing, compatible noncoordinating anions. Stable ionic complexes are achieved when the anions will not be a suitable ligand donor to the strongly Lewis acidic cationic organometallic transition metal cations used in insertion polymerization, i.e., inhibit ligand transfer that would neutralize the cations and render them inactive for polymerization. The Lewis acids fitting this description can be described by the following formula:

$$R_nAl(ArHal)_{3-n},$$

where R is a monoanionic ligand and ArHal is a halogenated $C_6$ aromatic or higher carbon number polycyclic aromatic hydrocarbon or aromatic ring assembly in which two or more rings (or fused ring systems) are joined directly to one another or together, and n=1 to 2, preferably n=1. In one embodiment, at least one (ArHal) is a halogenated $C_9$ aromatic or higher, preferably a fluorinated naphtyl. Suitable non-limiting R ligands include: substituted or unsubstituted $C_1$ to $C_{30}$ hydrocarbyl aliphatic or aromatic groups, substituted meaning that at least one hydrogen on a carbon atom is replaced with a hydrocarbyl, halide, halocarbyl, hydrocarbyl or halocarbyl substituted organometalloid, dialkylamido, alkoxy, siloxy, aryloxy, alkysulfido, arylsulfido, alkylphosphido, alkylphosphido or other anionic substituent; fluoride; bulky alkoxides, where bulky refers to $C_4$ and higher number hydrocarbyl groups, e.g., up to about $C_{20}$, such as tert-butoxide and 2,6-dimethylphenoxide, and 2,6-di(tert-butyl)phenoxide; —SR; —NR$_2$, and —PR$_2$, where each R is independently a substituted or unsubstituted hydrocarbyl as defined above; and, $C_1$ to $C_{30}$ hydrocarbyl substituted organometalloid, such as trimethylsilyl. Examples of ArHal include the phenyl, napthyl and anthracenyl radicals of U.S. Pat. No. 5,198,401 and the biphenyl radicals of WO 97/29845 when halogenated. The use of the terms halogenated or halogenation means for the purposes of this application that at least one third of hydrogen atoms on carbon atoms of the aryl-substituted aromatic ligands are replaced by halogen atoms, and more preferred that the aromatic ligands be perhalogenated. Fluorine is the most preferred halogen. The ligand descriptions of each the foregoing documents are incorporated by reference for information and U.S. patent practice purposes.

The R group, or ligand, may also be a covalently bonded metal/metalloid oxide or polymeric support. Lewis base-containing support substrates will react with the Lewis acidic cocatalyst activators of the invention to form support bonded Lewis acid compounds where one R group of $R_nAl(ArHal)_{3-n}$ is a covalently bonded support substrate. The Lewis base hydroxyl groups of silica are exemplary of metal/metalloid oxides where this method of bonding to a support at one of the aluminum coordination sites occurs.

Accordingly, the metal or metalloid oxide supports of the invention include any metal/metalloid oxides, preferably those having surface hydroxyl groups exhibiting a $pK_a$ equal to or less than that observed for amorphous silica, i.e., $pK_a$ less than or equal to about 11. In forming the invention, covalently bound anionic activator, the Lewis acid, is believed to form initially a dative complex with a silanol group (which acts as a Lewis base) thus forming a formally dipolar (zwitterionic) Bronsted acid structure bound to the metal/metalloid of the metal oxide support. Thereafter the proton of the Bronsted acid appears to protonate an R-group of the Lewis acid, abstracting it, at which time the Lewis acid becomes covalently bonded to the oxygen atom. The replacement R group of the Lewis acid then becomes R'—O—, where R' is a suitable support substrate, e.g., silica or hydroxyl group-containing polymeric support. Accordingly, any of the conventionally known inorganic oxides, silica, support materials that retain hydroxyl groups after dehydration treatment methods will be suitable in accordance with the invention. Because of availability, both of silica and silica containing metal oxide based supports, for example, silica-alumina, are preferred. Silica particles, gels and glass beads are most typical.

These metal oxide compositions may additionally contain oxides of other metals, such as those of Al, K, Mg, Na, Si, Ti and Zr and should preferably be treated by thermal and/or chemical means to remove water and free oxygen. Typically such treatment is in a vacuum in a heated oven, in a heated fluidized bed or with dehydrating agents such as organo silanes, siloxanes, alkyl aluminum compounds, etc. The level of treatment should be such that as much retained moisture and oxygen as is possible is removed, but that a chemically significant amount of hydroxyl functionality is retained. Thus calcining at up to 800° C. or more up to a point prior to decomposition of the support material, for several hours is permissible, and if higher loading of supported anionic activator is desired, lower calcining temperatures for lesser times will be suitable. Where the metal oxide is silica, loadings to achieve from less than 0.1 mmol to 3.0 mmol activator/g $SiO_2$ are typically suitable and can be achieved, for example, by varying the temperature of calcining from 200 to 800+° C. See Zhuralev, et al, Langmuir 1987, Vol. 3, 316 where correlation between calcining temperature and times and hydroxyl contents of silicas of varying surface areas is described.

The tailoring of hydroxyl groups available as attachment sites in this invention can also be accomplished by the pre-treatment, prior to addition of the Lewis acid, with a less than stoichimetric amount of the chemical dehydrating agents. Preferably those used will be used sparingly and will be those having a single ligand reactive with the silanol groups (e.g., $(CH_3)_4SiCl$), or otherwise hydrolyzable, so as to minimize interference with the reaction of the transition metal catalyst compounds with the bound activator. If calcining temperatures below 400° C. are employed, difunctional coupling agents (e.g., $(CH_3)_3SiCl_2$) may be employed to cap hydrogen bonded pairs of silanol groups which are present under the less severe calcining conditions. See for example, "Investigation of Quantitative SiOH Determination by the Silane Treatment of Disperse Silica", Gorski, et al, Journ. of Colloid and Interface Science, Vol. 126, No. 2, Dec. 1988, for discussion of the effect of silane coupling agents for silica polymeric fillers that will also be effective for modification of silanol groups on the catalyst supports of this invention. Similarly, use of the Lewis acid in excess of the stoichiometric amount needed for reaction with the transition metal compounds will serve to neutralize excess silanol groups without significant detrimental effect for catalyst preparation or subsequent polymerization.

Polymeric supports are preferably hydroxyl-functional-group-containing polymeric substrates, but functional groups may be any of the primary alkyl amines, secondary alkyl amines, and others, where the groups are structurally incorporated in a polymeric chain and capable of a acid-base reaction with the Lewis acid such that a ligand filling one coordination site of the aluminum is protonated and replaced by the polymer incorporated functionality. See, for example, the functional group containing polymers of U.S. Pat. No. 5,288,677.

Transition metal compounds suitable as olefin polymerization catalysts by coordination or insertion polymerization in accordance with the invention will include the known transition metal compounds useful in traditional Ziegler-Natta coordination polymerization and as well the metallocene compounds similarly known to be useful in coordination polymerization, when such compounds are capable of catalytic activation by the cocatalyst activators described for the invention. These will typically include Group 4 to 10 transition metal compounds wherein at least one metal ligand can be abstracted by the cocatalyst activators, particularly those ligands including hydride, alkyl and silyl. Ligands capable of abstraction and transition metal compounds comprising them include those metallocenes described in the background art, see for example U.S. Pat. No. 5,198,401 and PCT Publication WO 92/00333. Syntheses of these compounds is well known from the published literature. Additionally, where the metal ligands include halogen, amido or alkoxy moieties (for example, biscyclopentadienyl zirconium dichloride) which are not capable of abstraction with the activating cocatalysts of the invention, they can be converted into suitable ligands via known alkylation reactions with organometallic compounds such as lithium or aluminum hydrides or alkyls, alkylalumoxanes, Grignard reagents, etc. See also EP-Al-0 570 982 for the reaction of organoaluminum compounds with dihalo-substituted metallocene compounds prior to addition of activating anion compounds. All documents cited herein are incorporated by reference for purposes of U.S. patent practice.

Additional description of metallocene compounds which comprise, or can be alkylated to comprise, at least one ligand capable of abstraction to form a catalytically active transition metal cation appear in the patent literature, for example, U.S. Pat. Nos. 4,871,705, 4,937,299 and 5,324,800 and EP-A-0 129 368, EP-A-0 418 044, EP-A-0 591 756, WO 92/00333 and WO 94/01471. Such metallocene compounds can be described for this invention as mono- or bis-cyclopentadienyl substituted Group 4,5, or 6 transition metal compounds wherein the ancillary ligands may be themselves substituted with one or more groups and may be bridged to each other, or may be bridged through a heteroatom to the transition metal. The size and constituency of the ancillary ligands and bridging elements are not critical to the preparation of the ionic catalyst systems of the invention but should be selected in the literature described manner to enhance the polymerization activity and polymer characteristics being sought.

Generally, bulky ligand metallocene-type catalyst compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligands is η-bonded to the metal atom, most preferably $\eta^5$-bonded to the metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4. All documents are incorporated by reference for purposes of U.S. patent practice.

Metallocene compounds suitable for the preparation of polyethylene or ethylene-containing copolymers (where copolymer means comprising at least two different monomers) are essentially any of those known in the art, see again EP-A-0 277 004, WO 92/00333 and U.S. Pat. Nos. 5,001,205, 5,198,401, 5,324,800, 5,308,816, and 5,304,614 for specific listings. Selection of metallocene compounds for use to make isotactic or syndiotactic polypropylene, and their syntheses, are well-known in the art, specific reference may be made to both patent literature and academic, see for example Journal of Organmetallic Chemistry 369, 359–370 (1989). Typically those catalysts are stereorigid asymmetric, chiral, achiral or bridged chiral or achiral metallocenes. See for example, U.S. Pat. Nos. 4,892,851, 5,017,714, 5,296,434 and 5,278,264, PCT/US92/10066 and WO-A-93/19103, and EP-A2-0 577 581, EP-A1-0 578 838, and academic literature "The Influence of Aromatic Substituents on the Polymerization Behavior of Bridged Zirconocene Catalysts", Spaleck, W., et al, Organometallics 1994, 13, 954–963, and "ansa-Zirconocene Polymerization Catalysts with Annelated Ring Ligands-Effects on Catalytic Activity and Polymer Chain Lengths", Brinzinger, H., et al, Organometallics 1994, 13, 964–970, and documents referred to therein. Though many of the documents discussed above are directed to catalyst systems with alumoxane activators, the analogous metallocene compounds will be useful with the cocatalyst activators of this invention for active coordination catalyst systems, when the halogen, amide or alkoxy containing ligands of the metals (where occurring) are replaced with ligands capable of abstraction, for example, via an alkylation reaction as described above, and another is a group into which the ethylene group —C=C— may insert, for example, hydride, alkyl, or silyl. All documents are incorporated by reference for purposes of U.S. patent practice.

Representative metallocene compounds have the formula:

$L^A L^B L^C{}_i MAB$ where, $L^A$ is a substituted cyclopentadienyl or heterocyclopentadienyl ancillary ligand π-bonded to M; $L^B$ is a member of the class of ancillary ligands defined for $L^A$, or is J, a heteroatom ancillary ligand σ-bonded to M; the $L^A$ and $L^B$ ligands may be covalently bridged together through a Group 14 element linking group; $L^C{}_i$ is an optional neutral, non-oxidizing ligand having a dative bond to M (i equals 0 to 3); M is a Group 4 transition-metal; and, A and B are independently monoanionic labile ligands, each having a σ-bond to M, optionally bridged to each other or $L^A$ or $L^B$, which can be broken for abstraction purposes by a suitable activator and into which a polymerizable monomer or macromonomer can insert for coordination polymerization.

Non-limiting representative metallocene compounds include mono-cyclopentadienyl compounds such as pentamethylcyclopentadienyltitanium isopropoxide, pentamethylcyclopentadienyltribenzyl titanium, dimethylsilyltetramethyl-cyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethylcyclopentadienyl-dodecylamido hafnium dihydride, dimethylsilyltetramethylcyclopentadienyl-dodecylamido hafnium dimethyl, unbridged biscyclopentadienyl compounds such as bis(1,3-butyl, methylcyclopentadienyl) zirconium dimethyl, pentamethylcyclopentadienyl-cyclopentadienyl zirconium dimethyl, (tetramethylcyclopentadienyl)(n-propylcyclopetadienyl) zirconium dimethyl; bridged bis-cyclopentadienyl compounds such as dimethylsilylbis(tetrahydroindenyl) zirconium dichloride and silacyclobutyl (tetramethylcyclopentadienyl)(n-propyl-cyclopentadienyl) zirconium dimethyl; bridged bisindenyl compounds such as dimethylsilylbisindenyl zirconium dichloride, dimethylsilylbisindenyl hafnium dimethyl, dimethylsilylbis(2-methylbenzindenyl) zirconium dichloride, dimethylsilylbis(2-methylbenzindenyl) zirconium dimethyl; and fluorenyl ligand-containing compounds, e.g., diphenylmethyl (fluorenyl)(cyclopentadienyl)zirconiumdimethyl; and the additional mono- and bis-cyclopentadienyl compounds such as those listed and described in U.S. Pat. Nos. 5,017,714 and 5,324,800 and EP-A-0 591 756. All documents are incorporated by reference for purposes of U.S. patent practice.

Representative traditional Ziegler-Natta transition metal compounds include tetrabenzyl zirconium, tetra bis (trimethylsiylmethyl) zirconium, oxotris (trimethlsilylmethyl) vanadium, tetrabenzyl hafnium, tetrabenzyl titanium, bis(hexamethyl disilazido)dimethyl titanium, tris(trimethyl silyl methyl) niobium dichloride, tris(trimethylsilylmethyl) tantalum dichloride. The important features of such compositions for coordination polymerization are the ligand capable of abstraction and that ligand into which the ethylene (olefinic) group can be inserted. These features enable the ligand abstraction from the transition metal compound and the concomitant formation of the ionic catalyst composition of the invention.

Additional organometallic transition metal compounds suitable as olefin polymerization catalysts in accordance with the invention will be any of those Group 4 to 10 containing catalyst compounds that can be converted by ligand abstraction into a catalytically active cation and stabilized in that active electronic state by a noncoordinating or weakly coordinating anion sufficiently labile to be displaced by an olefinically unsaturated monomer such as ethylene. Exemplary compounds include those described in the patent literature. U.S. Pat. No. 5,318,935 describes bridged and unbridged bisamido transition metal catalyst compounds of Group 4 metals capable of insertion polymerization of olefins. Publications WO 96/23010, WO 97/48735 and Gibson, et. al., Chem. Comm., pp. 849–850 (1998), disclose diimine-based ligands for Group 8 to 10 metal compounds shown to be suitable for ionic activation and olefin polymerization. Transition metal polymerization catalyst systems from Group 5 to 10 metals wherein the active transition metal center is in a high oxidation state and stabilized by low coordination number polyanionic ancillary ligand systems are described in U.S. Pat. Nos. 5,502,124 and 5,504,049. Bridged bis(arylamido) Group 4 compounds for olefin polymerization are described by D. H. McConville, et al, in *Organometallics* 1995, 14, 5478–5480. Synthesis methods and compound characterization are presented. Further work appearing in D. H. McConville, et al, *Macromolecules* 1996, 29, 5241–5243, described the bridged bis (arylamido) Group 4 compounds are active catalysts for polymerization of 1-hexene. Additional transition metal compounds suitable in accordance with the invention include those described in WO 96/40805. Each of these documents is incorporated by reference for the purposes of U.S. patent practice.

Other transition metal catalyst compounds useful in the invention include those having heteroatoms in the cyclopentadienyl ligands as described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the transition metal catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. Other metallocene catalyst include those described in PCT publications WO 99/01481 and WO 98/42664, which are fully incorporated herein by reference.

When using the catalysts of the invention, particularly when immobilized on a support, the total catalyst system will generally additionally comprise one or more scavenging compounds. The term "scavenging compounds" as used in this application and its claims is meant to include those compounds effective for removing, preferably polar, impurities from the reaction environment. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion precursors activate the catalyst system. The polar impurities, or catalyst poisons, include water, oxygen, metal impurities, etc. Preferably steps are taken before provision of such into the reaction vessel, for example by chemical treatment or careful separation techniques after or during the synthesis or preparation of the various components, but some minor amounts of scavenging compound might still normally be used in the polymerization process itself.

Typically the scavenging compound will be an excess of the alkylated Lewis acids needed for initiation, as described above, or will be additional known organometallic compounds such as the Group 13 organometallic compounds of U.S. Pat. Nos. 5,153,157 and 5,241,025 and WO 91/09882, WO 94/03506, WO 93/14132, and WO 95/07941. Exemplary compounds include triethyl aluminum, triethyl borane, triisobutyl aluminum, methylalumoxane, isobutyl aluminumoxane, and tri-n-octyl aluminum. Those scavenging compounds having bulky or $C_6$–$C_{20}$ linear hydrocarbyl substituents covalently bound to the metal or metalloid center being preferred to minimize adverse interaction with the active catalyst. Examples include triethylaluminum, but more preferably, bulky compounds such as triisobutylaluminum, triisoprenylaluminum, and long-chain linear alkyl-substituted aluminum compounds, such as tri-n-hexylaluminum, tri-n-octylaluminum, or tri-n-dodecylaluminum. When alumoxane is used as an activator, any excess over the amount needed to activate the catalysts present will act as scavenger compounds and additional scavenging compounds may not be necessary. Alumoxanes also may be used in scavenging amounts with other means of activation, e.g., methylalumoxane and triisobutyl-aluminoxane. The amount of scavenging agent to be used with Group 4 to 10 catalyst compounds of the invention is minimized during polymerization reactions to that amount effective to enhance activity and avoided altogether if the feeds and polymerization medium can be sufficiently free of adventitious impurities.

The catalyst complexes of the invention are useful in polymerization of unsaturated monomers conventionally known to be polymerizable under coordination polymerization using metallocenes. Such conditions are well known and include solution polymerization, slurry polymerization, gas-phase polymerization, and high pressure polymerization. The catalyst of the invention may be supported (preferably as described above) and as such will be particularly useful in the known operating modes employing fixed-bed, moving-bed, fluid-bed, slurry or solution processes conducted in single, series or parallel reactors. Prepolymerization of supported catalyst of the invention may also be used for further control of polymer particle morphology in typical slurry or gas phase reaction processes in accordance with conventional teachings.

In alternative embodiments of olefin polymerization methods for this invention, the catalyst system is employed in liquid phase (solution, slurry, suspension, bulk phase or combinations thereof), in high pressure liquid or supercritical fluid phase, or in gas phase. Each of these processes may also be employed in singular, parallel or series reactors. The liquid processes comprise contacting olefin monomers with the above described catalyst system in a suitable diluent or solvent and allowing said monomers to react for a sufficient time to produce the invention copolymers. Hydrocarbyl solvents are suitable, both aliphatic and aromatic, hexane and toluene are preferred. Bulk and slurry processes are typically done by contacting the catalysts with a slurry of liquid monomer, the catalyst system being supported. Gas phase processes typically use a supported catalyst and are conducted in any manner known to be suitable for ethylene homopolymers or copolymers prepared by coordination polymerization. Illustrative examples may be found in U.S. Pat. Nos. 4,543,399, 4,588,790, 5,028,670, 5,382,638, 5352, 749, 5,436,304, 5,453,471 and 5,463,999, and PCT publication WO 95/07942. Each document cited is incorporated by reference for purposes of U.S. patent practice.

Generally speaking the polymerization reaction temperature can vary from about 40° C. to about 250° C. Preferably the polymerization reaction temperature will be from 60° C. to 220°, more preferably below 200° C. The pressure can vary from about 1 mm Hg to 2500 bar (2467 atm), preferably from 0.1 bar (0.1 atm) to 1600 bar (1579 atm), most preferably from 1.0 bar (0.98 atm) to 500 bar (490 atm).

Linear polyethylene, including high and ultra-high molecular weight polyethylenes, including both homo- and co- polymers with other alpha-olefin monomers, alpha-olefinic and/or non-conjugated diolefins, for example, $C_3$–$C_{20}$ olefins, diolefins or cyclic olefins, are produced by adding ethylene, and optionally one or more of the other monomers, to a reaction vessel under low pressure (typically<50 bar (49 atm)), at a typical temperature of 40 to 250° C. with the invention catalyst that has been slurried with a solvent, such as hexane or toluene. Heat of polymerization is typically removed by cooling. Gas phase polymerization can be conducted, for example, in a continuous fluid bed gas-phase reactor operated at 2000 to 3000 kPa and 60–160° C., using hydrogen as a reaction modifier (for example, 100–200 ppm), $C_4$–$C_8$ comonomer feedstream (0.5 to 1.2 mol %), and $C_2$ feedstream (25 to 35 mol %). See U.S. Pat. Nos. 4,543,399, 4,588,790, 5,028,670 and 5,405, 922 and 5,462,999, which are incorporated by reference for purposes of U.S. patent practice.

Ethylene-α-olefin (including ethylene-cyclic olefin and ethylene-α-olefin-diolefin) elastomers of high molecular weight and low crystallinity can be prepared utilizing the catalysts of the invention under traditional solution polymerization processes or by introducing ethylene gas into a slurry utilizing the α-olefin or cyclic olefin or mixture thereof with other monomers, polymerizable and not, as a polymerization diluent in which the invention catalyst is suspended. Typical ethylene pressures will be between 10 and 1000 psig (69 to 6895 kPa) and the polymerization diluent temperature will typically be between 40 and 160° C. The process can be carried out in a stirred tank reactor, or more than one operated in series or parallel. See the general disclosure of U.S. Pat. No. 5,001,205 for general process conditions. See also PCT publication WO 96/33227 and WO 97/22639. All documents are incorporated by reference for description of polymerization processes, metallocene selection and useful scavenging compounds.

Other olefinically unsaturated monomers besides those specifically described above may be polymerized using the catalysts according to the invention, for example, styrene, alkyl-substituted styrene, isobutylene, ethylidene norbornene, norbornadiene, dicyclopentadiene, and other olefinically-unsaturated monomers, including other cyclic olefins, such as cyclopentene, norbornene, and alkyl-substituted norbornenes. Additionally, alpha-olefinic macromonomers of up to 1000 mer units, or more, may also be incorporated by copolymerization.

Polymer Products

The polymers produced by the process of the invention can be used in a wide variety of products and end-use applications. The polymers produced by the process of the invention include linear low density polyethylene, elastomers, plastomers, high density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1.5 to about 4, particularly greater than 2 to about 3.5, more preferably greater than about 2 to less than about 3, and most preferably from about 2 to 3.

The melt strength of the polymers produced using the catalyst of the invention are in the range of from 6.5 cN to about 11 cN, preferably from 7 cN to 11 cN, and more preferably in the range of from 7 cN to 10 cN, and most preferably in the range of from 7 to 10 at a $I_2$ of about 1 g/10 min. For purposes of this patent application and appended claims melt strength is measured with an Instron capillary rheometer in conjunction with the Goettfert Rheotens melt strength apparatus. A polymer melt strand extruded from the capillary die is gripped between two counter-rotating wheels on the apparatus. The take-up speed is increased at a constant acceleration of 24 mm/sec$^2$, which is controlled by the Acceleration Programmer (Model 45917, at a setting of 12). The maximum pulling force (in the unit of cN) achieved before the strand breaks or starts to show draw-resonance is determined as the melt strength. The temperature of the rheometer is set at 190° C. The capillary die has a length of one inch (2.54 cm) and a diameter of 0.06" (0.1 5cm). The polymer melt is extruded from the die at a speed of 3 inch/min (7.62 cm/min). The distance between the die exit and the wheel contact point should be 3.94 inches (100 mm).

In preferred embodiment, the Melt Strength (MS) (measured in cN) of the polymers of the invention satisfy the following equation:

$$MS \geq 6.5 - 5.2*\log(MI)$$

wherein MI is the Melt Index or $I_2$ as determined using ASTM-D-1238-E. It is even more preferable that the MI in the formula above be in the range of from 0.4 dg/min to 5 dg/min., yet even more preferably from 0.5 dg/min to 4 dg/min, and most preferably from about 0.5 dg/min to 3 dg/min, especially for use in producing a film grade product.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference. The polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

The polymers of the present invention in one embodiment have a melt index (MI) or ($I_2$) as measured by ASTM-D-1238-E in the range from 0.01 dg/min to 100 dg/min, more preferably from about 0.01 dg/min to about 10 dg/min, even more preferably from about 0.1 dg/min to about 5 dg/min, and most preferably from about 0.1 dg/min to about 3 dg/min.

The polymers of the invention in an embodiment have a melt index ratio ($I_{21}/I_2$) ($_{21}$ is measured by ASTM-D-1238-F) of from 10 to less than 25, more preferably from about 15 to less than 25 and most preferably from about 15 about 20.

In yet another embodiment, propylene based polymers are produced in the process of the invention. These polymers include atactic polypropylene, isotactic polypropylene, hemiisotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene-type catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and nonfood contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multilayered constructions in the form of bottles, tanks, large hollow articles, rigid food containers and toys, etc.

EXAMPLES

The following examples are presented to illustrate the foregoing discussion. All parts, proportions and percentages are by weight unless otherwise indicated. All examples were carried out in dry, oxygen-free environments and solvents. Although the examples may be directed to certain embodiments of the present invention, they are not to be viewed as limiting the invention in any specific respect. In these examples certain abbreviations are used to facilitate the description. These include standard chemical abbreviations for the elements and certain commonly accepted abbreviations, such as : Me=methyl, THF, or thf,= tetrahydrofuran, and Cp*, permethylated cyclopentadienyl metal ligand.

All molecular weights are weight average molecular weight unless otherwise noted. Molecular weights (weight average molecular weight ($M_w$) and number average molecular weight ($M_n$) and ($M_z$) were measured by Gel Permeation Chromatography (GPC) as described below.

Examples 1 to 4 $M_w/M_n$ determinations were measured using a Waters 150 Gel Permeation Chromatograph equipped with a differential refractive index detector and calibrated using a broad calibration based on SRM-1475 (a linear Polyethylene standard obtained from NBS). Samples were run in 1,2,4-trichlorobenzene at 145° C. with a concentration of 1.5 mg/ml. The injection volume was 300 µl. The column set was three Shodex GPC AT-806 MS columns in series. This general technique is discussed in "Liquid Chromatography of Polymers and Related Materials III", J. Cazes Ed., Marcel Decker, 1981, Page 207.

Examples 21 and 22 $M_w/M_n$ determinations were measured using a Waters 150 Gel Permeation Chromatograph equipped with a differential refractive index detector and calibrated using polystyrene standards. Samples were run in 1,2,4-trichlorobenzene at 135° C. with a concentration of 1.0 to 1.5 mg/ml. The injection volume was 300 µl. The column set was three Polymer Laboratories PLGEL Mixed-B columns (with flow rate of 0.5 ml/min.). This general technique is discussed in "Liquid Chromatography of Polymers and Related Materials III", J. Cazes Ed., Marcel Decker, 1981, Page 207. For purposes of the appended claims the GPC method described for Examples 21 and 22 for determining $M_w$, $M_n$ or $M_z$ is to be used.

Tris-pentafluorophenylborane was purchased from Boulder Scientific Company and used as received. Anhydrous toluene and pentane was purchased from Aldrich. X-Ray Diffraction studies were performed by Crystalytics Company.

I. Unsupported Catalysts

Example A (Synthesis)

1. [(CH$_3$)$_2$CHCH$_2$)Al(C$_6$F$_5$)$_2$]$_2$-isobutyl aluminum di(pentafluorophenyl) B(C$_6$F$_5$)$_3$ (20.5 grams) was dissolved in toluene previously dried over sodium/potassium alloy. Triisobutylaluminum (15.8 grams) was added dropwise to the $B(C_6F_5)_3$ toluene solution. The solvent was removed under vacuum, pentane was added, and the solution was cooled to −30° C. The resulting white crystalline solid was dried under vacuum. An X-ray diffraction study of a crystal of this complex revealed a dimer complex in the solid state with the following formula: $[Al(\mu,\eta^2-C_6F_5)(C_6F_5)(i-C_4H_9)]_2$. $^{19}F$ NMR ($C_6D_6$; ref. to $CF_3C_6H_5\delta=-62.5$) δ−121.2, −151.2, −160.7. $^1H$ NMR ($C_6D_6$) δ0.53 d, 0.98 d, 1.88 m.

Example B (Synthesis)

2. $[(CH_3)Al(C_6F_5)_2]_n$ was synthesized analogous to the procedure described in the above synthesis of $[(CH_3)_2CHCH_2)Al(C_6F_5)_2]_2$.

Polymerization Process

This following is a general description of the polymerization process used with catalysts of the invention. Polymerizations were conducted in a stainless steel, 1-liter Zipperclave autoclave reactor. The reactor was equipped with water jacket for heating and cooling. Injections were typically done through a septum inlet or were injected via a high pressure nitrogen injection. Before the polymerizations, the reactor was purged with nitrogen for several hours at 100° C. Upon injection of the catalyst, ethylene or ethylene and hexene-1 was fed continuously on demand keeping the reactor pressure constant while maintaining the reaction temperature at 60° C. After a period of time the reaction was stopped by cooling and venting the pressure and exposing the contents of the reactor to air. The liquid components were evaporated and the ethylene homopolymer or ethylene/hexene-1 copolymer was dried in a vacuum oven. Weight average molecular weight ($M_w$), number average molecular weight ($M_n$) and their ratio $M_w/M_n$ were obtained by gel permeation chromatography (GPC) as described above. Hexene weight percent (wt %) incorporation was obtained from FTIR calibration data.

Example 1

$Me_2Si(H_4\text{-indenyl})_2Zr(CH_3)_2$ (20 mg) and $[Al(\mu,\eta^2-C_6F_5)(C_6F_5)(i-C_4H_9)]_2$ (40 mg) were combined in 10 mls of toluene. The resulting solution is yellow. Using the polymerization process described above, 2 mls of the catalyst precursor solution was injected into a 1 L stainless steel reactor preheated to 60° C. containing 45 mls of hexene-1, 75 psi (517 kPa) of ethylene, and 500 mls of hexane. After 40 minutes the polymerization reaction was stopped and 26.2 grams of polymer was isolated. The polymer produced had a $M_w$=79900, $M_n$=18600, $M_w/M_n$=4.30 and Hexene wt %=20.

Example 2

$Me_2Si(H_4\text{-indenyl})_2Zr(CH_3)_2$ (20 mg) and $[Al(C_6F_5)_2(CH_3)]_n$ (40 mg) were combined in 10 mls of toluene. The resulting solution is yellow. Using the polymerization process described above, 1.5 mls of the catalyst precursor solution was injected into a 1 L stainless steel reactor preheated to 60° C. containing 45 mls of hexene-1, 75 psi (517 kPa) of ethylene, and 500 mls of hexane. After 30 minutes the polymerization reaction was stopped and 12.2 grams of polymer was isolated. The polymer produced had a $M_w$=109000, $M_n$=16300, $M_w/M_n$=6.69 and Hexene wt %=19.

Example 3

$(Cp)_2Zr(CH_3)_2$ (20 mg) and $[Al(\mu,\eta^2-C_6F_5)(C_6F_5)(i-C_4H_9)]_2$ (56) were combined in 10 mls of toluene. The resulting solution is yellow. Using the polymerization process described above, 4 mls of the catalyst precursor solution was injected into a 1 L stainless steel reactor preheated to 60° C. containing 75 psi (517 kPa) of ethylene, and 500 mls of hexane. After 1 hour the polymerization reaction was stopped and 25.3 grams of polymer was isolated. The polymer produced had a $M_w$=344000, $M_n$=153000 and $M_w/M_n$=2.25.

Example 4

$(Cp)_2Zr(CH_3)_2$ (20 mg) and $[Al(C_6F_5)_2(CH_3)]_n$ (42 mg) were combined in 10 mls of toluene. The resulting solution is yellow. Using the polymerization process described above, 4 mls of the catalyst precursor solution was injected into a 1 L stainless steel reactor preheated to 60° C. containing 75 psi (517 kPa) of ethylene, and 500 mls of hexane. After 1 hour the polymerization reaction was stopped and 22.1 grams of polymer was isolated. The polymer produced had a $M_w$=337000, $M_n$=154000 and a $M_w/M_n$=2.19.

II. Supported Catalysts

Tris-pentafluorophenylborane was purchased from Boulder Scientific Company, and used as received. $Al(C_6F_5)_3$ was prepared according the method of Biagini, P. et al., as described in EP 0 694 548, herein incorporated by reference. Anhydrous toluene and pentane, and methyl lithium was purchased from Aldrich. The toluene was further dried over a sodium/potassium alloy. The silica used herein was obtained from W. R. Grace, Davison Division, Baltimore, Md. Triethylaluminum was purchased from Akzo Nobel, LaPorte, Texas. $(1,3\text{-BuMeCp})_2ZrCl_2$ was purchased from Boulder Scientific Company, $(1,3\text{-BuMeCP})_2ZrMe_2$ was obtained by the reaction of two equivalents of methyl lithium in diethyl ether. $Me_2Si(H_4\text{-indenyl})_2Zr(CH_3)2$ was obtained from Witco Corporation, Memphis, Tenn. In the following examples, ≡Si— is a 4-coordinate silicon atom of silica additionally bonded to the activating cocatalyst moiety identified.

Example 5 (Support Preparation)

≡Si—O—$Al(C_6F_5)_2$ A (600C)

$Al(C_6F_5)_3$(toluene) (10.8 grams) was added to a dry toluene slurry of silica (50.0 grams)(Davison 948 calcined at 600° C., available from W. R. Grace, Davison Division, Baltimore, Md.) at room temperature. The mixture was stirred, filtered, and dried under vacuum. An analogous reaction was performed in deuterated benzene. Elemental analysis showed aluminum 0.87 wt. % and carbon 4.94 wt. %. Note: Integration of the proton resonances in the $^1H$ NMR spectrum of the removed solvent revealed the formation of approximately one equivalent of pentafluorobenzene per equivalent of toluene (Eq. 1, below). (C6D6: δ2.1(s, 2.99H), 5.8 (m, 0.755H), 7.0 (m, 4.75H).

Tris-pentafluorophenylaluminum was reacted with silica (Davison 948, 600° C. and 800° C., both of which are available from W. R. Grace, Davison Division, Baltimore, Md.) to liberate pentafluorobenzene, Eq. 1. For example, Davison 948 dehydrated at 600° C. silica with approximately 0.6 mmoles —OH per gram of silica was reacted with one equivalent of $Al(C_6F_5)_3$ (toluene) per equivalent of —OH in deuterated benzene. After approximately 24 hours the slurry was filtered and an $^1HNMR$ spectrum of the solvent revealed an approximate one to one ratio of toluene to pentafluorobenzene indicating the reaction shown in Eq. 1 had taken place.

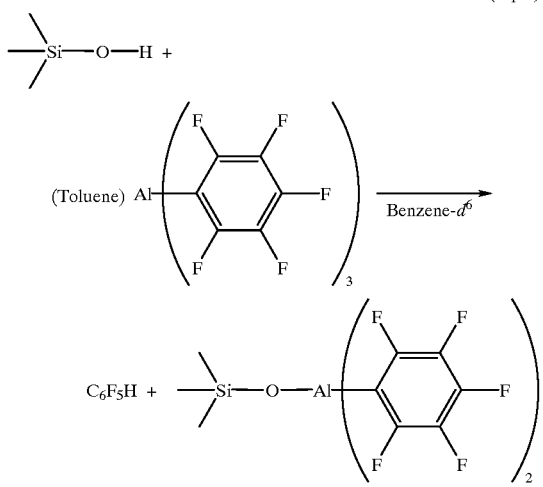

(Eq. 1)

Example 6 (Support Preparation)
≡Si—O—Al(C$_6$F$_5$)$_2$/≡Si—O—AlEt$_2$ A (600C)

Triethylaluminum (0.52 grams) was added to a dry toluene slurry of (10.5 grams) silica ≡Si—O—Al(C$_6$F$_5$)$_2$ A (600C) (as prepared in Example 5) at room temperature. The mixture was stirred, filtered, and dried under vacuum. Elemental analysis showed an aluminum 2.26 wt. %, carbon 3.57 wt. % and hydrogen 3.57 wt. %. Note: Triethylaluminum was added to further remove residual Si—OH groups on the silica.

Example 7 (Support Preparation)
≡Si—O—Al(C$_6$F$_5$)$_2$ (800C)

Al(C$_6$F$_5$)$_3$(toluene) (3.5 grams) was added to a dry toluene slurry of silica (20.0 grams)(Davison 948 calcined at 800° C., available from W. R. Grace, Davison Division, Baltimore, Md.) at room temperature. The mixture was stirred, filtered, and dried under vacuum.

Example 8 (Support Preparation)
≡Si—O—Al(C$_6$F$_5$)$_2$/≡Si—O—AlEt$_2$ (800C)

Triethylaluminum (0.6 grams) was added to a dry toluene slurry of silica ≡Si—O—Al(C$_6$F$_5$)$_2$ (800C) (as prepared in Example 7) (16 grams) at room temperature. The mixture was stirred, filtered, and dried under vacuum. Elemental analysis showed aluminum 1.55 wt. % and carbon 5.88 wt. %.

Example 9 (Support Preparation)
≡Si—O—Al(C$_6$F$_5$)$_2$ B (600C)

Al(C$_6$F$_5$)$_3$(toluene) (3.0 grams) was added to a dry toluene slurry of silica ≡Si—O—Al(C$_6$F$_5$)$_2$ A (600C) (16 grams) at room temperature. The slurry was stirred overnight, filtered, washed with dry toluene, and dried under vacuum. Elemental analysis showed aluminum 1.76 wt. % and carbon 5.61 wt. %.

Example 10

Catalyst A Preparation 2.00 grams of silica (≡Si—O—Al(C$_6$F$_5$)$_2$ A (600C)) as prepared in Example 5 was slurried in 20 ml of dry toluene at room temperature. (1,3-BuMeCp)$_2$ZrMe$_2$ (0.27 grams) in 3 mls of toluene was added to the slurried support. The support appeared yellow in the slurry which upon filtering and washing with dry toluene resulted in a yellow powder. The toluene washings were almost colorless, indicative of retention of the catalyst on the support.

Slurry-Phase Ethylene-Hexene Polymerization Using Catalyst A

Polymerizations were conducted in a stainless steel, 1-liter Zipperclave autoclave reactor. The reactor was equipped with water jacket for heating and cooling. Injections were performed via a high pressure nitrogen injection. (400 mls isobutane, 30 mls of hexene, and 15 μls triethylaluminum or 100 μls triisobutylaluminum. Before polymerizations the reactor was purged with nitrogen for several hours at 100° C. Upon injection of catalyst ethylene was fed continuously on demand keeping the reactor pressure constant (130 psig (896 kPa) ethylene) while maintaining the reaction temperature at 85° C. After a period of time the reaction was stopped by cooling, venting the pressure and exposing the contents of the reactor to air. The liquid components were evaporated and the ethylene/hexene-1 copolymer was dried under a N$_2$ purge. Weight average molecular weight (M$_w$), number average molecular weight (M$_n$) and their ratio M$_w$/M$_n$ were obtained by GPC as described above. Hexene-1 wt % incorporation was obtained from $^1$HNMR data.

The above procedure was performed using 25 mgs of Catalyst A. After 40 minutes the reaction was stopped. No reactor fouling was observed and 16.8 grams of polymer resin (1120 g pol./g cat. h) was obtained. Note: After several days the activity of the catalyst had degraded.

Example 11

Catalyst B Preparation

≡2.00 grams of silica ≡Si—O—Al(C$_6$F$_5$)$_2$/≡Si—O—AlEt$_2$ A (600C) (as prepared in Example 5) was slurried in 20 ml of dry toluene at room temperature. (1,3-BuMeCp)$_2$ZrMe$_2$ (0.22 grams) in 3 mls of toluene was added to the slurried support. The support appeared brown in the slurry which upon filtering and washing with dry toluene resulted in a tan powder. The yellow toluene washings were removed and 0.12 grams of unreacted metallocene was obtained. Elemental analysis showed zirconium 1.16 wt. %.

Slurry-Phase Ethylene-Hexene Polymerization using Catalyst B

The polymerization was run according to the procedure outlined in Example 10 using catalyst B. No reactor fouling was observed and the polymer resin yield was 39.5 grams (2370 g pol./g cat. h). Duplicate runs over several days gave yield activities of 1280 g pol./g cat. h; 1430 g pol./g cat. h; 1980 g pol./g cat. h (cat. stored at −30° C. for several days).

Example 12

Catalyst C Preparation

Catalyst C was prepared according to the method of Example 10 using 0.14 grams of (1,3-BuMeCp)$_2$ZrMe$_2$ except that the silica, ≡Si—O—Al(C$_6$F$_5$)$_2$ (800C) (as prepared in Example 7) was used instead of the silica (≡Si—O—Al(C$_6$F$_5$)$_2$ A (600C)). Elemental analysis showed zirconium 1.39 wt. %.

Slurry-Phase Ethylene-Hexene Polymerization using Catalyst C

The polymerization was run according to the procedure outlined in Example 10 except catalyst C was used. No reactor fouling was observed and the polymer resin yield was 20.9 grams (1390 g pol./g cat. h).

Example 13

Catalyst D Preparation

Catalyst D was prepared according to the method of Example 10 using 0.042 grams of $(1,3\text{-BuMeCp})_2\text{ZrMe}_2$ except that the silica, $\equiv$Si—O—Al$(C_6F_5)_2$ (800C) was used instead of the silica ($\equiv$Si—O—Al$(C_6F_5)_2$ A (600C)). Elemental analysis showed zirconium 0.43 wt. %.

Slurry-Phase Ethylene-Hexene Polymerization Using Catalyst D

The polymerization was run according to the procedure outlined in Example 10 except catalyst D was used. No reactor fouling was observed and the polymer resin yields for three runs were 9.03 grains (602 g pol./g cat. h), 9.21grams (614 g pol./g cat. h), 8.96 grams (597 g pol./g cat. h).

Example 14

Catalyst E Preparation

Catalyst E was prepared according to the method of Example 10 using 0.14 grams of $(1,3\text{-BuMeCp})_2\text{ZrMe}_2$ except that the silica, $\equiv$Si—O—Al$(C_6F_5)_2$/$\equiv$Si—O—AlEt$_2$ (800C) (as prepared in Example 7) was used instead of the silica ($\equiv$Si—O—Al$(C_6F_5)_2$ A (600C)). Elemental analysis showed zirconium 1.10 wt. %.

Slurry-Phase Ethylene-Hexene Polymerization Using Catalyst E

The polymerization was run according to the procedure outlined in Example 10 except Catalyst E was used. No reactor fouling was observed and the polymer resin yield was 10.36 grains (691 g pol./g cat. h).

Example 15

Catalyst F Preparation

Catalyst F was prepared according to the method of Example 10 using 0.0453 grams of Me$_2$Si(H$_4$-indenyl)$_2$Zr(CH$_3$)$_2$) except that the silica, $\equiv$Si—O—Al$(C_6F_5)_2$/$\equiv$Si—O—AlEt$_2$ A (600C) (as prepared in Example 6) was used instead of the silica ($\equiv$Si—O—Al$(C_6F_5)_2$ A (600C)). Elemental analysis showed zirconium 0.38 wt. %.

Slurry-Phase Ethylene-Hexene Polymerization using Catalyst F

The polymerization was run according to the procedure outlined in Example 10 except Catalyst F was used and 20 mls of hexene was used instead of 30 mls hexene. No reactor fouling was observed and the polymer resin yields were 4.11 grams (274 g pol./g cat. h), 7.83 grams (522 g pol./g cat. h).

Example 16

Catalyst G Preparation

Catalyst G was prepared according to the method of Example 10 using 0.045 grams of Me$_2$Si(H$_4$-indenyl)$_2$Zr(CH$_3$)$_2$) except that the silica, $\equiv$Si—O—Al$(C_6F_5)_2$ (800C) was use instead of the silica ($\equiv$Si—O—Al$(C_6F_5)_2$ A (600C)). Elemental analysis showed zirconium 0.42 wt. %.

Slurry-Phase Ethylene-Hexene Polymerization Using Catalyst G

The polymerization was run according to the procedure outlined in Example 10 Catalyst G was used and 20 mls of hexene-1 was used instead of 30 mls hexene-1. No reactor fouling was observed and the polymer resin yields were 8.27 grams (551 g pol./g cat. h), 6.27 grams (418 g pol./g cat. h), 6.51 grams (434 g pol./g cat. h).

Example 17

Catalyst H Preparation

Catalyst H was prepared according to the method of Example 10 using 0.10 grams of $(1,3\text{-BuMeCp})_2\text{ZrMe}_2$ except that the silica, ($\equiv$Si—O—Al$(C_6F_5)_2$ B (600C)) was used instead of the silica ($\equiv$Si—O—Al$(C_6F_5)_2$ A (600C)). Elemental analysis; zirconium 1.07 wt. %.

Slurry-Phase Ethylene-Hexene Polymerization Using Catalyst H

The polymerization was run according to the procedure outlined in Example 10 except Catalyst H was used. No reactor fouling was observed and the polymer resin yield was 53.95 grams (3597 g pol./g cat. h). Note: Enhanced polymerization activity was noted upon allowing the trisperfluorophenylaluminum complex longer contact time with ($\equiv$Si—OH) (overnight versus several hours). Furthermore, catalyst activity did not degrade with catalysts prepared with ($\equiv$Si—O—Al$(C_6F_5)_2$ B (600C)) support/activator. However, we found that overnight reactions or longer with the silica supports should not be stirred with a stir bar. The stir bar crushes the silica particles overnight into very fine dust.

Example 18

Catalyst I Preparation

Catalyst I was prepared according to the method of Example 10 using 0.05 grams of Me$_2$Si(H$_4$-indenyl)$_2$Zr(CH$_3$)$_2$) except that the silica, ($\equiv$Si—O—Al$(C_6F_5)_2$ B (600C)) was used instead of the silica ($\equiv$Si—O—Al$(C_6F_5)_2$ A (600C)). Elemental analysis showed zirconium 0.68 wt. %.

Slurry-Phase Ethylene-Hexene Polymerization Using Catalyst I

The polymerization was run according to the procedure outlined in Example 10 except Catalyst I was used and 20 mls of hexene was used instead of 30 mls hexene. No reactor fouling was observed and the polymer resin yield was 6.67 grams (445 g pol./g cat. h).

Example 19

Catalyst J Preparation

Catalyst J was prepared according to the method of Example 10 using 0.043 grams of $(1,3\text{-BuMeCp})_2\text{ZrMe}_2$. The silica, ($\equiv$Si—O—Al$(C_6F_5)_2$ (600C)) was prepared assuming 0.8 mmoles of hydroxyl content per gram of silica. Residual Al$(C_6F_5)_3$ was filtered off after allowing the slurry to sit overnight without stirring.

Slurry-Phase Ethylene-Hexene Polymerization Using Catalyst J

The polymerization was run according to the procedure outlined in Example 10 except Catalyst J was used and 100 mls of triisobutylaluminum were injected into the reactor in place of 15 mls of triethylaluminum. No reactor fouling was observed and the polymer resin yield was 76.2 grams (5080 g pol./g cat. h).

Example 20 (Support Preparation)

100 grams of ≡Si—O—H (Davison 948 calcined @ 600° C., available from W. R. Grace, Davison Division, Baltimore, Md.) was combined with a toluene solution of MeAl($C_6F_5$)$_2$ prepared from 27 grams of Al($C_6F_5$)$_3$(toluene) and 1.56 grams of trimethylaluminum. Vigorous methane evolution was observed. The resulting slurry was stirred for several hours after which stirring was stopped and the slurry was left overnight under a nitrogen atmosphere. The silica was filtered and dried under a vacuum.

Example 21 (Catalyst Preparation)

Catalyst K 30 grams of this ≡Si—O—Al($C_6F_5$)$_2$ (as prepared in Example 20) in toluene was combined with 1.18 grams of (1,3-BuMeCp)$_2$ZrMe$_2$. The slurry was stirred 1.5 hours during which a dark orange/brown color develops. The slurry was filtered and the supported catalyst was dried under vacuum (salmon colored support).

Example 22 (Catalyst Preparation)

Catalyst L 30 grams of this ≡Si—O—Al($C_6F_5$)$_2$ (as prepared in Example 20) in toluene was combined with 2.25 grams of (PropylCp)$_2$HfMe2. The slurry as stirred 1.5 hours during which a yellow color develops. The slurry was filtered and the supported catalyst was dried under vacuum (yellow colored support).

Polymerization Process

All the catalysts prepared in Examples 21 and 22 were screened in a fluidized bed reactor equipped with devices for temperature control, catalyst feeding or injection equipment, GC analyzer for monitoring and controlling monomer and gas feeds and equipment for polymer sampling and collecting. The reactor consists of a 6 inch (15.24 cm) diameter bed section increasing to 10 inches (25.4 cm) at the reactor top. Gas comes in through a perforated distributor plate allowing fluidization of the bed contents and polymer sample is discharged at the reactor top.

TABLE 1

| Example Number | 22 | 21 |
|---|---|---|
| Temperature (° F.) (° C.) | 175 (79.4) | 175 (79.4) |
| Pressure (psi) (kPa) | 300 (2067) | 300 (2067) |
| Ethylene (mole %) | 34.9 | 35.1 |
| Hydrogen (mole ppm) | 178 | 97 |
| Hydrogen/Ethylene Concentration ratio | 5.1 | 2.8 |
| Hexene (mole %) | 0.34 | 0.59 |
| Hexene/Ethylene Concentration | 0.0753 | 0.079 |
| Bed Weight (g) | 1911 | 1912 |
| Residence Time (hrs) | 4.4 | 4.8 |
| Productivity[1] (g/g) | 1091 | 1912 |
| Gas Velocity (ft/sec) (cm/sec) | 1.51 (46) | 1.61 (49) |
| Production Rate (g/hr) | 435 | 398 |
| Bulk Density (g/cc) | 0.4153 | 0.3970 |

[1]Productivity is number of grams of product per gram of catalyst.

TABLE 2

| Example Number | 22 | 21 |
|---|---|---|
| Density (g/cc) | 0.918 | 0.918 |
| Melt Index (g/10 min) (I$_2$) | 0.88 | 1.06 |
| Melt Index Ratio (MIR) (I$_{21}$/I$_2$) | 18.8 | 17.3 |
| Melt Strength (cN) | 7.8 | 9.5 |
| M$_n$ | 44,500 | 45,900 |
| M$_w$ | 124,000 | 110,700 |
| M$_z$ | 254,200 | 199,300 |
| M$_w$/M$_n$ | 2.79 | 2.41 |
| M$_z$/M$_w$ | 2.05 | 1.80 |
| CDBI (%) | 68.1 | 52.2 |
| Weight % Hexene | 7.9 | 7.9 |
| Mole % Hexene | 2.8 | 2.8 |

While the present invention has been described and illustrated by reference to particular embodiments, those of ordinary skill in the art will appreciate that the invention lends itself to variations not necessarily illustrated herein. For example, it is contemplated that two or more catalysts of the invention can be used or a catalyst system of the invention with any other metallocene/alumoxane supported or unsupported catalyst system. In addition two different Lewis acid aluminum compounds of the invention may be used in conjunction with an organometallic catalyst compound or transition metal catalyst compound. Alternatively, a Lewis acid aluminum compound of the invention and a Lewis acid boron compound may be used in conjunction with an organometallic catalyst compound. For this reason, then, reference should be made solely to the appended claims for purpose of determining the true scope of the present invention.

What is claimed is:

1. A process for the preparation of polyolefins from one or more olefinic monomers comprising combining said olefins under olefin polymerization conditions with an organometallic catalyst compound that is activated for olefin polymerization by reaction with a Lewis acid aluminum compound of the formula:

$$R_nAl(ArHal)_{3-n},$$

wherein "ArHal" is a halogenated aryl group, n=1 or 2, and R is a monoanionic group other than a halogenated aryl group.

2. The process of claim 1 wherein said monoanionic group is one or two groups selected from a group consisting of hydride, $C_1$–$C_{30}$ hydrocarbyl and substituted hydrocarbyl, alkoxide and aryloxide, siloxide, halocarbyl and substituted halocarbyl, bridged and unbridged dialkylamido, and hydrocarbyl and halocarbyl substituted organometalloid.

3. The process of claim 1 wherein said organometallic catalyst compound is a Group 3 to 10 transition metal compound capable of activation for olefin polymerization by ligand abstraction.

4. The process of claim 1 wherein said organometallic catalyst compound is a Group 4 metallocene compound having the formula:

$$L^AL^BL^C_iMAB$$

where, $L^A$ is a substituted or unsubstituted cyclopentadienyl or heterocyclopentadienyl ancillary ligand η-bonded to M; $L^B$ is a member of the class of ancillary ligands defined for $L^A$, or is J, a heteroatom ancillary ligand σ-bonded to M; the $L^A$ and $L^B$ ligands may be covalently bridged together through a Group 14 element linking group; $L^C_i$ is an optional neutral, non-oxidizing ligand having a dative bond to M (i equals 0 to 3); M is a Group 4 transition metal; and, A and B are independently monoanionic labile ligands, each having a σ-bond to M, optionally bridged to each other or $L^A$ or $L^B$, which can be broken for abstraction purposes by a suitable activator and into which a polymerizable monomer or macromonomer can insert for coordination polymerization.

5. The process of claim 1 wherein said olefin polymerization conditions comprise a solution, supercritical pressure, bulk, slurry or gas phase process conducted at reaction temperatures between −20° C. to 200° C. and pressures between 0 to 2000 bar (1960 atm).

6. The process of claim 4 wherein said process is bulk, slurry or gas phase, n=1 and R is a covalent connecting group linking the aluminum atom of said Lewis acid to a metal/metalloid support or polymeric support.

7. The process of claim 6 wherein said support is silica.

8. The process of claim 6 wherein said support is polymeric.

9. The process of claim 4 wherein M is titanium and $L^B$ is J, a heteroatom ancillary ligand σ-bonded to M.

10. The process of claim 4 wherein M is zirconium or hafnium and $L^B$ is independently a substituted or unsubstituted cyclopentadienyl or heterocyclopentadienyl ancillary ligand π-bonded to M.

11. A continuous process for polymerizing one or more olefin(s) in the presence of a supported composition comprising a transition metal catalyst compound and at least one Lewis acid aluminum compound of the formula:

$$R_nAl(ArHal)_{3-n},$$

wherein "ArHal" is a halogenated aryl group, n=1 or 2, and R is a monoanionic group other than a halogenated aryl group.

12. The process of claim 11 wherein the olefin(s) are ethylene or ethylene and one or more olefins having from 3 to 20 carbon atoms.

13. The process of claim 11 wherein the Lewis acid aluminum compound is supported on an inorganic oxide.

14. The process of claim 11 wherein the process is a gas phase fluidized bed process.

* * * * *